United States Patent [19]

Koga et al.

[11] 3,872,385

[45] Mar. 18, 1975

[54] FIXTURE FOR MEASURING PARAMETERS OF QUARTZ CRYSTAL UNITS

[75] Inventors: Issac Koga; Shigeo Kobayashi; Isao Okamoto, all of Tokyo, Japan

[73] Assignee: Kabusai Denshin Denwa Kabushiki Kaisha, Tokyo, Japan

[22] Filed: Mar. 5, 1974

[21] Appl. No.: 448,398

Related U.S. Application Data

[62] Division of Ser. No. 372,165, June 21, 1973, Pat. No. 3,832,636.

[30] Foreign Application Priority Data

June 28, 1972 Japan .............................. 47-64064

[52] U.S. Cl. ............................... 324/56, 324/158 F
[51] Int. Cl. ............................................. G01r 29/22
[58] Field of Search .......................... 324/56, 158 F

[56] References Cited
UNITED STATES PATENTS

| | | | |
|---|---|---|---|
| 3,348,147 | 10/1967 | Erath | 324/158 F |
| 3,490,036 | 1/1970 | Grenier | 324/56 |
| 3,743,925 | 7/1973 | Bossi | 324/158 F X |
| 3,756,851 | 9/1973 | Rennick et al. | 324/56 X |

*Primary Examiner*—Gerard R. Strecker
*Attorney, Agent, or Firm*—Paul & Paul

[57] ABSTRACT

The present invention discloses a method and fixtures for measuring parameters of quartz crystal units in the very high frequency (VHF) range. A non-reactive frequency and resistance of the crystal unit are determined, a radio-frequency voltage is applied to a series circuit composed of said crystal unit and a circuit which is adjustable to non-reactive resistance, the phase of the terminal voltage across said circuit which is adjustable to non-reactive resistance is adjusted so as to coincide with the phase of the terminal voltage across said series circuit. Next, said crystal unit is replaced by another crystal unit, and the frequency of said radio-frequency voltage is adjusted so that the above-mentioned two phases coincide. Thus the non-reactive frequencies and or resistances of a plurality of crystal units are quickly determined.

2 Claims, 13 Drawing Figures

FIXTURE FOR MEASURING PARAMETERS OF QUARTZ CRYSTAL UNITS

This is a division of application Ser. No. 372,165 filed June 21, 1973 which has issued on Aug. 17, 1974 as U.S. Pat. No. 3,832,631.

The present invention relates to a method and some fixtures for simply measuring parameters of quartz crystal units and especially for simply and precisely measuring the non-reactive frequency and resistance of a quartz crystal unit in a very high frequency (VHF) range. Herein, non-reactive frequency and resistance are frequency and resistance respectively when the impedance of a crystal unit becomes non-reactive.

Measuring parameters of a quartz crystal unit, especially measuring precisely the frequency of a quartz crystal unit is very important, and various measuring methods are used in European countries and America. Recently, a precise measurement for VHF crystals is required. However, based on careful investigation by the inventors it has been found that the measuring principles and circuits, which are now actually used are not satisfactory even when an operating frequency is not very high, because of stray inductances and capacitances existing in between the circuit elements including lead wires.

An object of the present invention is to provide a method and some fixtures which can effect a sufficiently accurate measurement by duly getting rid of the effect of the above-mentioned stray inductances and capacitances even in the VHF range.

Further features and advantages of the present invention will be apparent from the ensuing description with reference to the accompanying drawings to which, however, the scope of the invention is in no way limited.

We assume firstly that an element which is purely non-reactive and whose resistance value is known, is realizable in HF or VHF range by a certain suitable means. As it is realized that this assumption may be questioned, a method for its realization will be detailed hereinafter. When this assumption is realized, the following adjustment is possible. That is, connecting the above-mentioned purely non-reactive element (say, element A) in series with a circuit (say B) which is adjustable so as to become non-reactive and applying a radio frequency voltage to the series circuit of element A and circuit B, circuit B can be adjusted so that the phase difference between the terminal voltage $V_o$ across the above-mentioned series circuit and the terminal voltage $V_l$ across circuit B become null by observing the above-mentioned phase difference with an instrument such as vector voltmeter 8405A manufactured by Hewlett Packard Co.

Figure 1A:
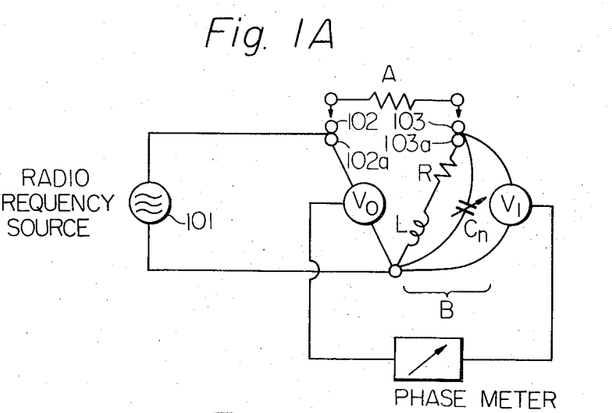
FIG. 1A is a circuit diagram explaining the principle of the present invention.

Circuit B is, as shown in FIG. 1, composed of a resistor R including a stray inductane L, a variable capacitor $C_n$ which is connected in parallel to resistor R, and a voltmeter $V_l$ indicating the voltage appearing across the terminals of the above-mentioned parallel circuit. The susceptance of circuit B viewed from its terminals can be adjusted to null by adjusting variable capacitor $C_n$ so that the sum of the capacitance of capacitor $C_n$ and the voltmeter compensates for the effect of stray inductance L of resistor R.

When the above-mentioned adjustment of circuit B is carried out at a certain frequency $f_o$, circuit B virtually becomes non-reactive in the frequency range lower than $f_o$ provided that $2\pi f_o L/R$ is sufficiently small. The resistance of circuit B can be given by the following equation, $$V_o/V_l = (R_A + R_B)/R_B \text{ or } R_B = R_A/((V_o/V_l) - 1)$$

where $R_A$ and $R_B$ are resistances of resistor A and circuit B respectively.

Figure 1B:
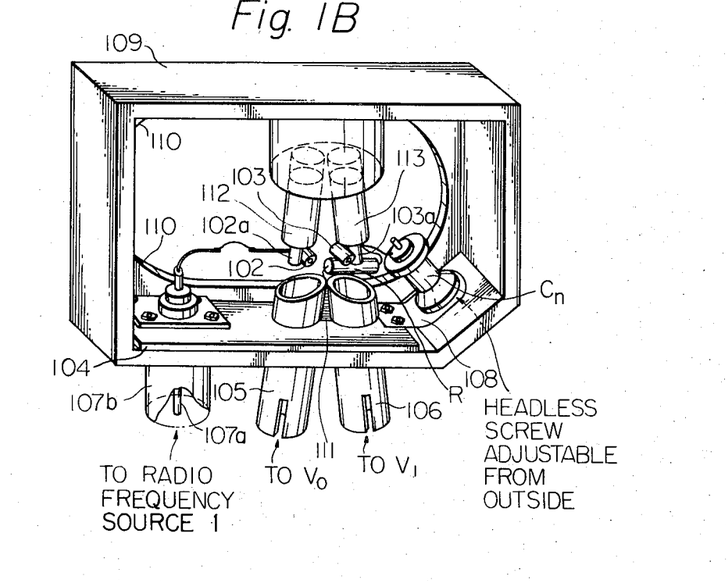
FIG. 1B shows a fixture for carrying out the method according to the present invention using the circuit diagram shown in FIG. 1A.

After this adjustment, connecting a quartz crystal unit (say C) of a frequency lower than $f_o$ between sockets 102 and 103 in place of resistor A, the frequency of a radio-frequency source 101 is adjusted so that two voltages $V_o$ and $V_l$ become again in phase, and the adjusted frequency indicates the non-reactive frequency of quartz crystal unit C. The non-reactive resistance $R_C$ of quartz crystal unit C can be determined by the following relation between the two voltages $V_o$ and $V_l$.

$$V_o/V_l = (R_C + R_B)/R_B \text{ or } R_C = R_B((V_o/V_l) - 1).$$

Figure 1C:
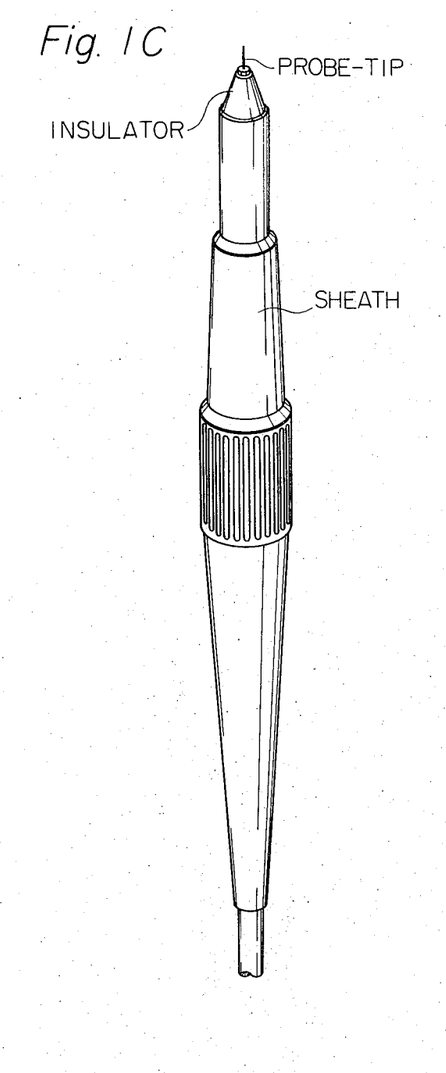
FIG. 1C is an example of a probe of a voltmeter which is adaptable to the fixture shown in FIG. 1B and FIG. 7B. When the probe shown in FIG. 1C is inserted into receptacle 105 (106) in FIG. 1B, the probe-tip will be inserted firmly in socket 102a (103a)

One arrangement of the embodiment of the above-mentioned method is shown in FIG. 1B, and an example of a probe of a voltmeter which is adaptable to the arrangement is shown in FIG. 1C. Important points to be noticed concerning the arrangements are as follows.

(a). Sockets 102a and 103a for the probe-tips are directly welded or soldered to two sockets 102 and 103 respectively.

(b). A large flat copper plate 104 is provided so as to minimize the potential differences among the following: each of two receptacles for voltmeter-sheaths 105 and 106; outer conductor 107b of the connector to the radio-frequency source, and; ribbon shape conductor 108 to the base electrode of variable capacitor $C_n$. In addition, a wedge shape copper plate 111 is provided between the two receptacles 105 and 106 for the same purpose.

(c). Sockets 102, 102a and 103, 103a are supported by two long insulators 112 and 113 in order to minimize the capacitances between them.

d. A headless screw (not visible in FIG. 1B) is provided for the adjustment of capacitor $C_n$ from outside.

e. Frame 109 of the fixture is made of insulating material, so that parasitically distributed capacitances between the elements of the circuit are as small as possible.

f. A vent hole 110 is provided so that the interior temperature of the fixture rapidly becomes equal to the ambient temperature, particularly when the fixture is operated in a thermostat.

An important point which is left out of the above explanation is how an element which is purely non-reactive and whose resistance value is known is realized. The inventors were successful in determining the non-reactive frequency $f_r$ and the non-reactive resistance $R_r$ for any one quartz crystal unit by method, which will be explained in detail hereinafter. Moreover, such quartz crystal unit is used as the purely non-reactive element A of this invention.

Figure 2A:
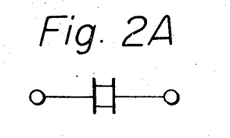
FIGS. 2A –2C are respectively a crystal unit, an equivalent circuit of the crystal unit and an admittance circle diagram of the crystal unit.
Figure 2B:
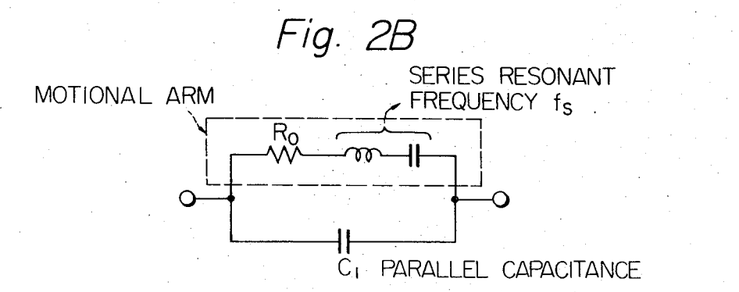
Figure 2C:
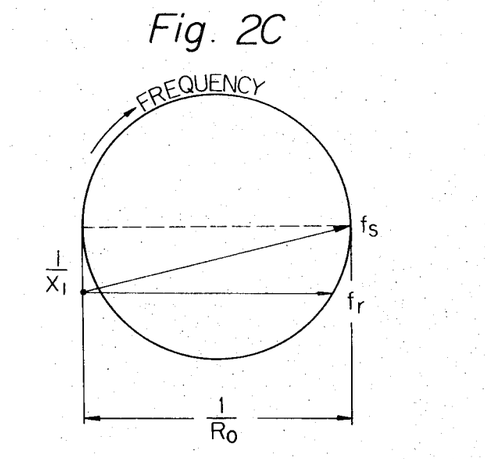

In describing the precision determination of $f_r$ and $R_r$, we shall refer to the well known equivalent network of a crystal unit and an admittance circle, shown in FIGS. 2A – 2C. The determination of the reactance of parallel capacitance C (say $X_l$) will be described first, and then the determination of the series resonant frequency $f_s$ and the resistance $R_o$ of the motional arm. Next the theoretical determination of $f_r$ in terms of $f_s$ and $R_o/X_l$ will be described and, finally, the determination of $R_r$.

A. A method of determining the reactance $X_l$.

Figure 3:
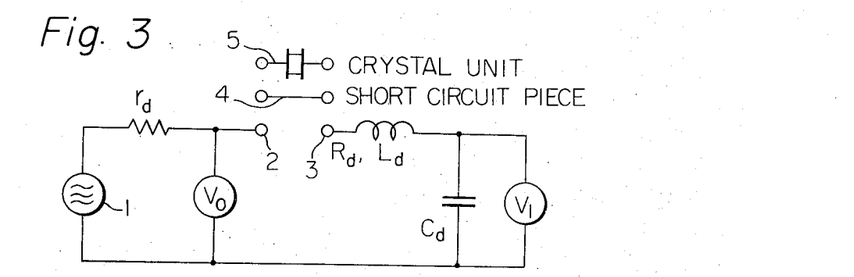
FIG. 3 is a circuit diagram showing one embodiment of the present invention.

First, an explanation will be given concerning a method of determining the reactance $X_l$. As shown in FIG. 3, a series resonance circuit, which is composed of a coil $L_d$ whose resistance is $R_d$ and a capacitor $C_d$, is connected via a pair of sockets 2 and 3 for the crystal unit under measurement and a ballast resistor $r_d$ to a radio frequency source 1. The ballast resistor $r_d$ is provided only for the purpose of maintaining the load more or less constant for the radio frequency source 1, and about 50 Ω is selected as the value of the ballast resistor $r_d$.

First, a short circuit piece 4 is placed between the sockets 2 and 3 for the crystal unit and the voltage $V_o$ is measured with regard to an exciting frequency $f$ while maintaining the voltage $V_l$ at a constant value. Then, the following equation is obtained.

$$V_o = I(1/j\omega C_d + R_d + j\omega L_d)$$

where $\omega = 2\pi f$ $I$, the current through $R_d L_d C_d$, is equal to $j\omega C_d \cdot V_l$. Then $$V_o/V_l = R_d j\omega C_d - \omega^2 L_d C_d + 1$$

Therefore $$(V_o/V_l)^2 = (R_d \omega C_d)^2 + (1 - \omega^2 L_d C_d)^2 = (f^2/f_d^2 - 1 + \tfrac{1}{2}\alpha)^2 + \alpha - \tfrac{1}{4}\alpha^2$$

where $1/(2\pi f_d)^2 = L_d C_d$, and $\alpha = R_d^2 C_d/L_d$.

Figure 4:
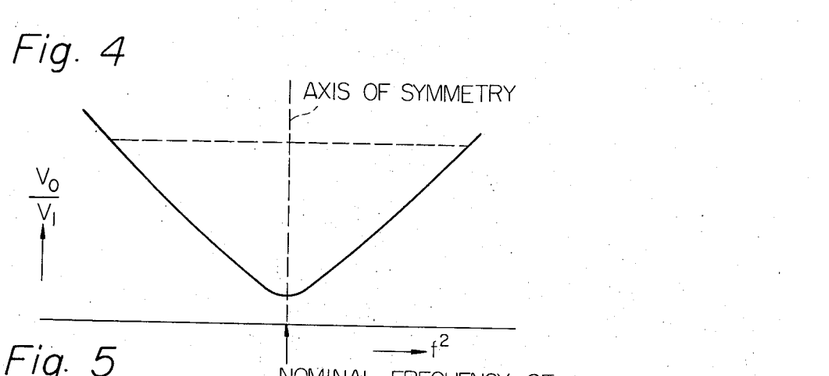
FIGS. 4 –6 are diagrams explaining the characteristics of the circuit shown in FIG. 3.

If $V_o/V_l$ is graphically represented with respect to $f$, a V-shape curve will be obtained, and if $f^2$, instead of $f$, is taken for the abscissa as shown in FIG. 4, the curve becomes symmetrical with respect to the vertical axis at $f^2/f_d^2 = 1 - \tfrac{1}{2}\alpha$, and the value of $V_o/V_l$ becomes equal to $(\alpha - \tfrac{1}{4}\alpha^2)^{1/2}$, the minimum value.

$\alpha$, which is equal to the inverse square of the quality factor of $R_d L_d C_d$ circuit, is extremely small compared with 1. Accordingly, a frequency where the value $V_o/V_l$ becomes minimum is virtually a natural frequency $f_d$. By using this relation, the capacitor $C_d$ is adjusted so that the natural frequency $f_d$ coincides with the nominal frequency of the crystal unit in the initial four digits.

As it is rather laborious to indicate the abscissa of FIG. 4, by a scale of squared frequency $f^2$, the following method may actually be used instead.

Since it is desirable that the quality factor $Q$ (= $1/\sqrt{\alpha}$) of the circuit $R_d L_d C_d$ is selected to be a value as large as possible, we may assume that said value is of the order of one hundred. Therefore, an impedance at a frequency which is separated a few percent from the frequency where the impedance of this circuit becomes the minimum impedance reaches several times said minimum impedance. For the purpose of coinciding the frequency of said minimum impedance to a nominal frequency of the crystal unit, the following method is useful. First the voltage $V_o$ is measured at two frequencies, one of which is 4.00 percent higher than the nominal frequency of the crystal unit and the other of which is 4.17 percent lower than the nominal frequency of the crystal unit. The capacitor $C_d$ is then adjusted so that the voltage $V_o$ becomes equal to the mean value of the two measured voltages at one of the above-mentioned frequencies. After the voltage $V_o$ is again measured at said two frequencies. If, now, the two values 21 of $V_o$ are coincident, the adjustment of $C_d$ is completed. If these two values are not coincident, said adjustment of capacitor $C_d$ must be continued.

Figure 5:
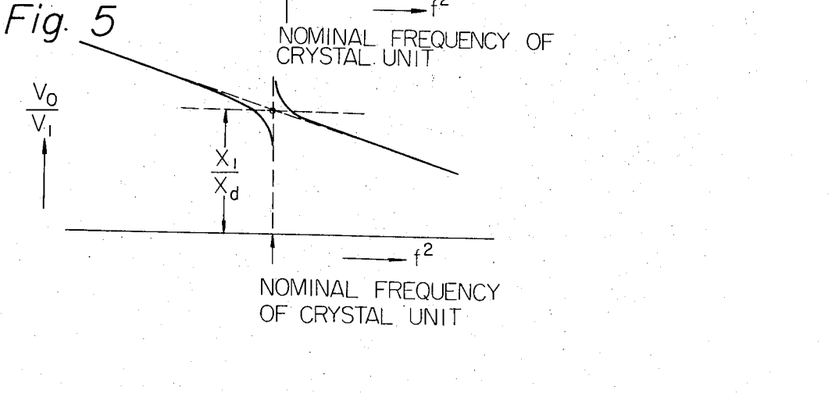

After completing the above-mentioned adjustment, the short circuit piece 4 is replaced with crystal unit 5, the frequency of radio frequency source 1 is adjusted within the range of about ±10 percent of said nominal frequency, and $V_o$ is measured by keeping $V_1$ constant. This is shown in FIG. 5. The following equation can then be obtained except for a portion near the series resonance frequency $f_s$ of the motional arm of the crystal unit.

$$V_o = I([1/j\omega C_l] + R_d + j\omega L_d + [1/j\omega C_d])$$

where $I = j\omega C_d \cdot V_l$ as stated earlier; and $C_l$ is the parallel capacitance, the inductance of the lead wires from the terminals to the blank of the crystal being taken into account.

Rearranging the above equation and neglecting $R_d$ results in $$V_o/V_l = C_d/ - \omega^2 L_d C_d + 1$$

Since this equation shows that $V_o/V_1$ is linear with respect to $\omega^2$, the curve of $V_o/V_l$ tends to a straight line as shown by a broken straight line. This means that the broken straight line shows the relation between $V_o/V_l$ and $f^2$, provided that the motional arm of the unit is omitted from the circuit. Moreover, since $L_d C_d$ is already tuned to the nominal frequency of the unit, $$-\omega^2 L_d C_d + 1 = 0.$$

Consequently, at the nominal frequency of the crystal unit, $$V_o/V_l = C_d/C_l = X_l/X_d$$

where $X_l = 1/(2\pi f_n C_l)$, $X_d = 1/(2\pi f_n C_d)$ and $f_n$ is the nominal frequency.

By introducing a measured value of capacitor $C_d$, the value of $X_l$ can be determined.

Also in the case of FIG. 5, when it is desired to avoid the laboriousness of representing the abscissa by a scale of squared frequency, the values of $V_o/V_l$ can be measured at two frequencies of the exciting source, one of which is 10.00 percent higher than the nominal frequency of the crystal unit and the other of which is 11.12 percent lower than the nominal frequency, and then the means of the two values of $V_o/V_l$ at the two frequencies is equal to $C_d/C_l$ or $X_l/X_d$.

B. A method of determining the series resonant frequency $f_s$, the resistance $R_o$, etc.

A method of determining the natural frequency $f_s$, the resistance $R_o$, etc., of the motional arm of the crystal unit will next be explained. An outline of this method was already made known in the 24th Annual Frequency Control Symposium held in Atlantic City, N.J. in April, 1970.

As explained already by using FIG. 3, we firstly tune $L_dC_d$ to the nominal frequency of the crystal unit. The quality factor Q of the circuit $R_dL_dC_d$ is of the order of several hundred at the most, and, on the other hand, the operating frequency range for a crystal unit is extremely narrow. Hence, if the natural frequency $f_d$ is adjusted to be in coincidence with the nominal frequency of the unit, the entire circuit including the unit is equivalent to the case where only the resistance $R_d$ is in series with the unit, when viewed from the terminals of voltmeter $V_o$. The current through the capacitor $C_d$ is virtually equal to $2\pi f_s C_d V_l$ or $V_l/X_d$, where $V_l$ is the terminal voltage across the capacitor $C_d$. Thus the following relation holds at any frequency f of exciting voltage $V_o$:

$$V_o = 2\pi f C_d V_l Z,$$

where $I$ is the impedance of the unit including the series resistance $R_d$.

Transformation of the last equation results in $$(V_o/V_l)^2 = (Z/X_d)^2$$

Figure 6:
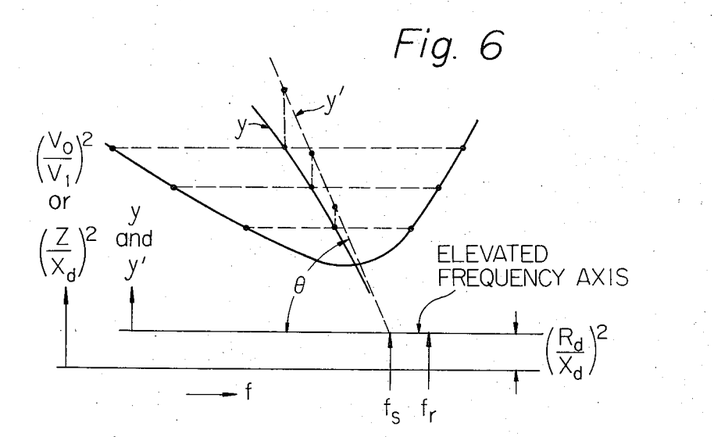

FIG. 6 shows the relation between $(V_o/V_l)^2$ with reference to $f$.

The locus y, obtained by plotting the central points between the two points corresponding to various values of $(V_o/V_l)^2$, becomes a branch of a hyperbola. When the curvature of this locus y is not small, a straight line y' is very useful. y' is drawn by plotting values of y multipled by $b/(b-y)$, where $b = (X_l/X_d)^2$. The two curves y and y' cross at a point on the horizontal line which is situated at the height of $(R_d/X_d)^2$ from the axis $f$, (for the sake of convenience, we call it "elevated frequency axis").

This intersecting point of y''to the elevated frequency axis gives the series resonant frequency $f_s$ of the motional arm.

Generally, $R_d$ is very small compared with $R_o$, and in such a case, the elevated frequency axis is very close to the frequency axis, and the intersecting points of y' with the frequency axis and the elevated frequency axis make no difference in $f_s$. If the locus y is virtually a straight line, y' can, of course, be dispense with.

Next, the inclination $\theta$ of the locus y' is estimated from the graph of FIG. 6. Then the frequency $f_r$ where the crystal unit becomes purely non-reactive is given by the following equation.

$$f_r = f_s + [½ - (¼ - \pi^2)^{1/2}](X_l/X_d)^2 \cot\theta,$$

where $\alpha = R_o/X_l = (R_o/X_d)/(X_l/X_d)$.

When the frequency of the radio frequency source is set the the value of $f_r$ that is given in the abovementioned equation, the non-reactive resistance $R_r$ is given by $(V_o/V_l)X_d$ at this frequency $f_r$.

Figure 7A:
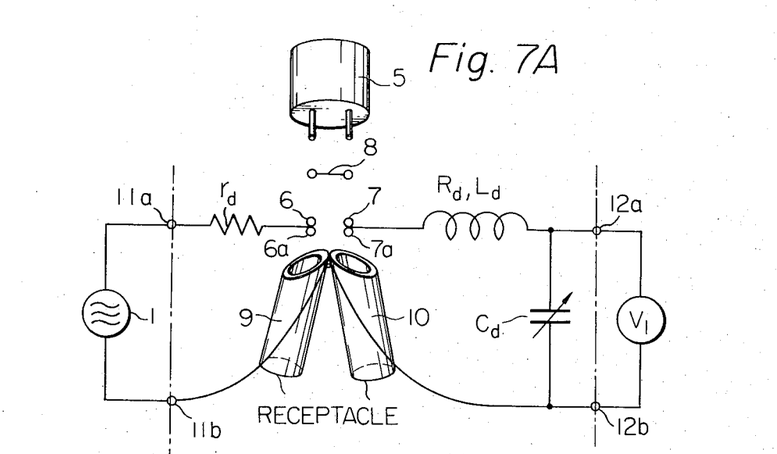
FIG. 7A is a circuit diagram showing another embodiment of the present invention.
Figures 7B, 7C:
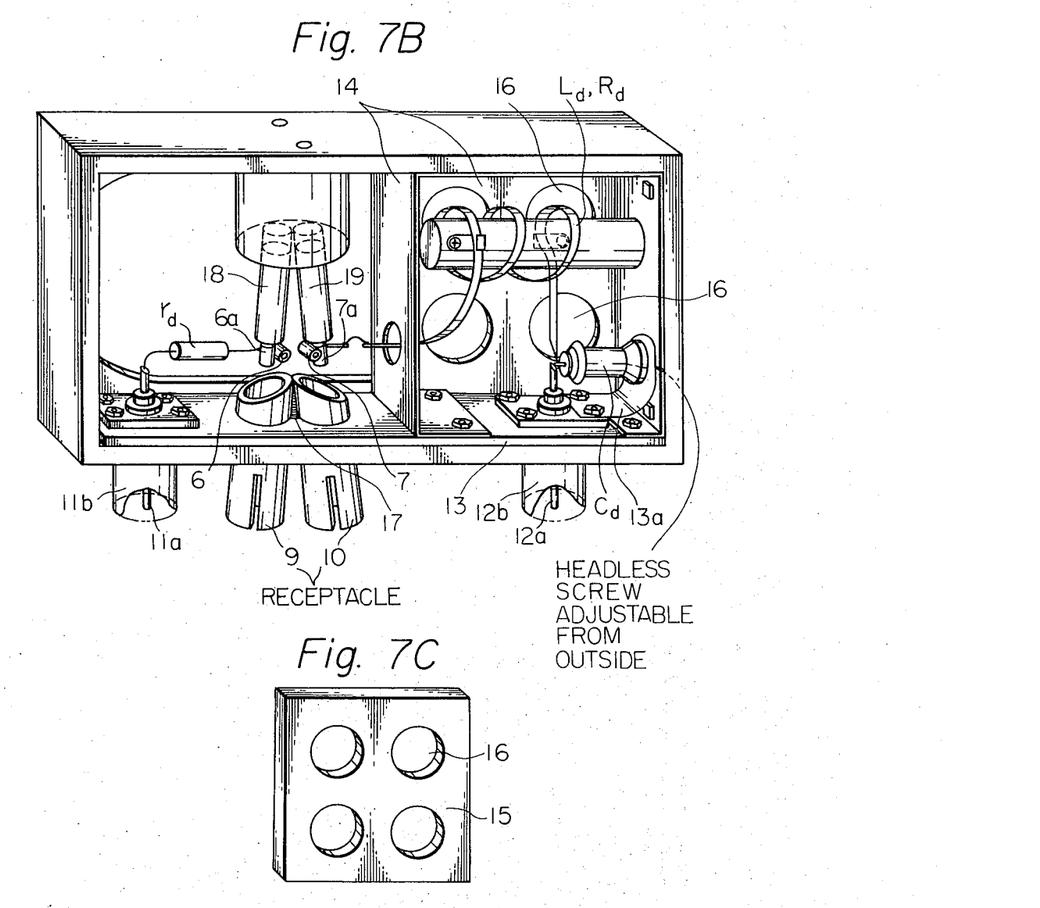
FIGS. 7B is a fixture for carrying out the method according to the present invention using the circuit diagram shown in FIG. 7A.
FIG. 7C is a lid for the shielding box shown in FIG. 7B. Both lid and shielding box are made of copper.

Another embodiment of the present invention will next be explained. With respect to a crystal unit of VHF, it is preferable to use the following improved method. This is because the short circuit piece 4 in FIG. 3, used at first during tuning of the circuit $R_dL_dC_d$ to the frequency of the crystal unit, cannot be sufficiently non-reactive. Accordingly, the replacement of this short circuit piece with the crystal unit does not rigorously mean that the total circuit is exactly equal to the crystal unit plus $R_d$. Therefore, it is preferable to use a fixture as shown in FIGS. 7A through 7C. Referring to FIGS. 7A and 7B, the fixture of the present invention comprises a high frequency source 1, a pair of sockets 6 and 7 where the crystal unit 5 and a connecting piece 8 are alternately inserted, and a pair of sockets 6a and 7a, into one of which the probe-tip of a voltmeter is inserted. The sockets 6 and 7 are welded or soldered to the sockets 6a and 7a respectively. In the above-mentioned arrangement, when the sheath of the probe is inserted into the receptacle 9, 10, a tip of the probe is actually in contact with one of the terminals of the crystal unit. The receptacles 9 and 10 for the sheaths of voltmeters are welded or soldered together at the position nearest the terminals 6 and 7, and also welded or soldered to a copper plate 13. A headless screw (not visible in FIG. 7B) is provided for the adjustment of capacitor $C_d$ from the outside.

Large flat copper plate 13 is provided in order to minimize the potential differences among the following: each of the two receptacles 9 and 10; outer conductor 11b of the connector to the radio-frequency source and; ribbon shape conductor 13a to the base electrode of variable capacitor $C_d$. In addition, a wedge shape copper plate 17 is provided between the two receptacles 9 and 10 for the same purpose. Sockets 6, 6a and 7, 7a are supported by long insulators 18 and 19 in order to minimize the capacitance between them.

The circuit $L_dC_d$ is enclosed by a shield box 14 together with its lid 15 shown in FIG. 7C in order to minimize mutual induction between internal objects of the shield box and external objects. Vent holes 16 shown in FIGS. 7B and 7C are provided on the shield box 14 and its lid 15 so that the interior temperatures of the fixture rapidly become equal to the ambient temperature, particularly when the fixture is operated in a thermostat.

For the measurement of various constants of the crystal unit with above-mentioned fixture, the connecting piece 8 is first connected between sockets 6 and 7, and the probe-tip of a voltmeter is inserted into the receptacle 10 so as to observe the voltage $V_o$, and another voltmeter is connected to the terminals 12a and 12b for the purpose of observing the voltage $V_1$. A radio frequency source is connected to 11a and 11b. By adjusting the value of $C_d$, following the procedure already described with reference to FIG. 3, the circuit $R_dL_dC_d$ is tuned to the nominal frequency of the crystal unit. In this case, the role of the connecting piece is different from the short circuit piece 4 in FIG. 3, because the connecting piece is only to make the path from the source to the circuit $R_dL_dC_d$.

When the connecting piece 8 is replaced by the crystal unit 5, the probe of the voltmeter is moved from the receptacle 10 to 9, and then $V_o$ exactly indicates the total voltage across the crystal unit plus the whole circuit $R_dL_dC_d$.

By following the above-mentioned procedure, the reactance of a connecting piece itself can also be determined. A typical example of the reactance value of the connecting piece which was determined by the above-mentioned procedure was 2.6Ω at 100 MHz. This value is not negligibly small, because said value causes an error on the order of $0.5 \times 10^{-6}$ for $f_s$ of a crystal unit in the range of 100 MHz.

What is claimed is:

1. A fixture for measuring parameters of crystal units comprising
   a. two pairs of sockets,
      the first pair being adapted for inserting a crystal unit (say A) which may be freely selected from a plurality of crystal units to be tested and a crystal unit (say C) which is selected from the remainder of said plurality of crystal units, alternately,
      the second pair being adapted for inserting probe-tips of voltmeters thereinto,
      the first sockets of said two pairs are directly coupled together,
      the second sockets of said two pairs are directly coupled together;
   b. two probe receptacles which are connected to each other with a wedge shaped copper plate, and when probe sheaths are inserted into said receptacles, the probe-tips thereof are inserted into the sockets of second pair;
   c. a circuit (say B) which is composed of a resistor in parallel with a variable capacitor ($C_n$), the first terminal of the circuit B being connected to said second sockets, the second terminal of the circuit B being connected to junction points of said two probe receptacles;
   d. a large flat plate of copper whereto said wedge shaped copper plate, said probe receptacles and said second terminal of said circuit B are coupled for equalizing their potentials, and;
   e. a connector for supplying a radio frequency current from a radio frequency source to the crystal unit to be tested which is inserted into the sockets.

2. A fixture for measuring parameters of crystal units comprising
   a. two pairs of sockets,
      the first pair being adapted for inserting a crystal unit to be tested and a connecting piece, alternately,
      the second pair being adapted for inserting probe-tips of voltmeters thereinto;
      the first sockets of said two pairs are directly coupled together;
      the second sockets of said two pairs are directly coupled together;
   b. two probe receptacles which are connected to each other with a wedge shaped copper plate, and when probe sheaths are inserted into said receptacles, the pobe-tips thereof are inserted into the sockets of second pair;
   c. a circuit (say B) which is composed of
      coil $L_d$ and an ajustable capacitor $C_d$ which is connected in series with said coil, the first terminal of the circuit B being connected to said second sockets, the second terminal of the circuit B being connected to the junction points of said two probe receptacles;
      a connector for connecting the probe tip of a voltmeter to the terminal of said adjustable capacitor $C_d$ by means of a suitable adapter;
   d. a large flat plate of copper whereto said wedge shaped copper plate, said probe receptacles and said second terminal of said circuit B are coupled for equalizing their potentials, and
   e. a connector for supplying a radio frequency current from a radio frequency source to the crystal unit to be tested which is inserted into the sockets.

* * * * *

UNITED STATES PATENT OFFICE
CERTIFICATE OF CORRECTION

Patent No. 3,872,385　　　　　　　　　　Dated March 18, 1975

Inventor(s) Issac Koga; Shigeo Kobayashi; and Isao Okamoto

It is certified that error appears in the above-identified patent and that said Letters Patent are hereby corrected as shown below:

Column 1, [73] delete "Kabusai" and insert --Kokusai--

Signed and sealed this 17th day of June 1975.

(SEAL)
Attest:

RUTH C. MASON
Attesting Officer

C. MARSHALL DANN
Commissioner of Patents
and Trademarks